United States Patent [19]
Hagen et al.

[11] Patent Number: 6,056,069
[45] Date of Patent: May 2, 2000

[54] LATCH FOR AN ADJUSTABLE LINK ASSEMBLY

[75] Inventors: Paul D. Hagen, Yorkville; Kenneth W. Huck; Vern I. Woodruff, both of DeKalb; Kevin R. Paarlberg, Sycamore, all of Ill.

[73] Assignee: Caterpillar Inc., Peoria, Ill.

[21] Appl. No.: 09/335,619

[22] Filed: Jun. 18, 1999

[51] Int. Cl.⁷ .................................................. A01B 59/043
[52] U.S. Cl. ............................... 172/679; 403/44; 403/46
[58] Field of Search ..................................... 172/439, 450, 172/677, 679, 681, 776; 403/43, 46, 44; 280/460.1, 461.1, 455.1

[56] References Cited

U.S. PATENT DOCUMENTS

| | | | |
|---|---|---|---|
| 2,541,964 | 2/1951 | Hennings . | |
| 2,920,500 | 1/1960 | Edman . | |
| 2,929,458 | 3/1960 | Cole | 172/446 |
| 3,053,552 | 9/1962 | Horney . | |
| 3,371,945 | 3/1968 | Adams et al. . | |
| 3,384,937 | 5/1968 | Muncke et al. . | |
| 4,194,757 | 3/1980 | Lucas et al. . | |
| 5,076,369 | 12/1991 | Herchenbach | 172/439 |
| 5,361,850 | 11/1994 | Muller et al. | 172/450 |

Primary Examiner—Christopher J. Novosad
Attorney, Agent, or Firm—Maginot, Addison & Moore; Jeffery A. Greene

[57] ABSTRACT

A latch for a link assembly is disclosed. The link assembly has (i) an internally threaded sleeve and (ii) an externally threaded rod positioned within the internally threaded sleeve so that the externally threaded rod is meshingly engaged with the internally threaded sleeve. The latch includes a handle portion operable between a lock mode and an unlock mode, wherein when the handle portion is (i) in the lock mode relative rotation between the internally threaded sleeve and the externally threaded rod is prevented and (ii) in the unlock mode relative rotation between the internally threaded sleeve and the externally threaded rod is allowed. The latch also includes an engagement portion secured to the handle portion. The engagement portion is (i) detached from the link assembly so that the engagement portion can be spaced apart from the link assembly and (ii) configured to engage a segment of the link assembly such that when (1) the handle portion is in the unlock mode and (2) the segment of the link assembly is engaged with the engagement portion, rotation of the handle portion around a longitudinal axis of the link assembly causes relative rotation between the internally threaded sleeve and the externally threaded rod. An associated method of adjusting the length of a link assembly is also disclosed.

20 Claims, 4 Drawing Sheets

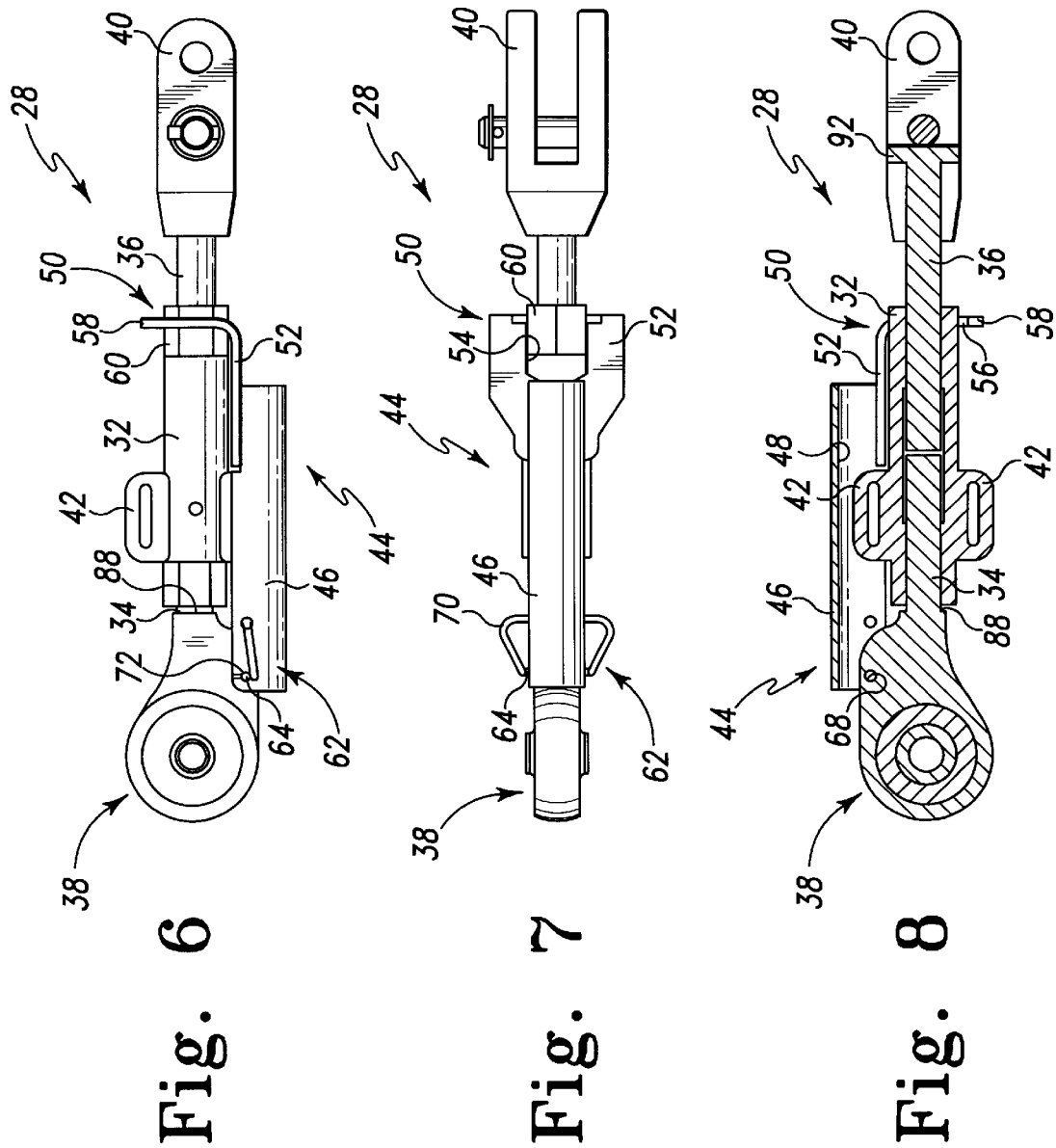

LATCH FOR AN ADJUSTABLE LINK ASSEMBLY

TECHNICAL FIELD OF THE INVENTION

The present invention relates generally to a coupling arrangement for a work machine, and more particularly to a latch for a link assembly and an associated method of adjusting the length of a link assembly.

BACKGROUND OF THE INVENTION

A work machine, such as an agricultural tractor, typically includes a coupling arrangement (sometimes referred to as a 3-point hitch) for attaching a work implement to the work machine. The coupling arrangement generally includes a link assembly for connecting an arm and a bar which extend outwardly from the frame of the work machine.

The link assembly includes an internally threaded sleeve and an externally threaded rod positioned within the internally threaded sleeve. The externally threaded rod meshingly engages the internally threaded sleeve so that relative rotation between these two elements in a first direction causes the externally threaded rod to be advanced out of the internally threaded sleeve thereby increasing the length of the link assembly. In the alternative, relative rotation between these two elements in a second direction causes the externally threaded rod to be advanced further into the internally threaded sleeve thereby decreasing the length of the link assembly. Adjusting the length of the link assembly in the above described manner is important for ensuring that the work implement is appropriately attached to the work machine.

Heretofore, various devices have been utilized to accomplish the above described relative rotation between the internally threaded sleeve and the externally threaded rod. For example, a wrench can be used to accomplish the rotation. However, utilizing a separate tool such as a wrench is inconvenient for the operator of the work machine since he or she must constantly carry the tool with them in order to make the appropriate adjustments to the length of the link assembly.

In addition, a separate tool such as a wrench does not address the problem of the length of the link assembly inadvertently changing during the use of the work machine. In particular, vibrations generated during use of the work machine are communicated to the internally threaded sleeve and the externally threaded rod through various work machine structures. These vibrations can cause relative rotation between the internally threaded sleeve and the externally threaded rod. As a result, the length of the link assembly inadvertently changes during use of the work machine which can adversely effect the performance of a work function.

In an attempt to address the aforementioned problem, some coupling arrangements include a latch for preventing the relative rotation between the internally threaded sleeve and the externally threaded rod. Some of these latches are designed so that when they are unlatched they can function as a handle which is attached to the internally threaded sleeve or the externally threaded rod. This handle is grasp and rotated by the operator of the work machine so as to cause relative rotation between these elements and thereby change the length of the link assembly.

However, a drawback to these types of latches is that they are permanently attached (e.g. pinned) to the link assembly. Having the latch permanently attached to the link assembly significantly decreases the flexibility with which the latch can be positioned during the time it is used as a handle to accomplish above described relative rotation. As a result, these types of latches are difficult to use and decrease the efficiency with which an operator can adjust the length of the link assembly.

What is needed therefore is a coupling arrangement which overcomes one or more of the above-mentioned drawbacks.

DISCLOSURE OF THE INVENTION

In accordance with a first embodiment of the present invention, there is provided a latch for a link assembly. The link assembly includes (i) an internally threaded sleeve and (ii) an externally threaded rod positioned within the internally threaded sleeve so that the externally threaded rod is meshingly engaged with the internally threaded sleeve. The latch includes a handle portion operable between a lock mode and an unlock mode, wherein when the handle portion is (i) in the lock mode relative rotation between the internally threaded sleeve and the externally threaded rod is prevented and (ii) in the unlock mode relative rotation between the internally threaded sleeve and the externally threaded rod is allowed. The latch also includes an engagement portion secured to the handle portion. The engagement portion is (i) detached from the link assembly so that the engagement portion can be spaced apart from the link assembly and (ii) configured to engage a segment of the link assembly such that when (1) the handle portion is in the unlock mode and (2) the segment of the link assembly is engaged with the engagement portion, rotation of the handle portion around a longitudinal axis of the link assembly causes relative rotation between the internally threaded sleeve and the externally threaded rod.

In accordance with a second embodiment of the present invention, there is provided a coupling arrangement for a work machine. The coupling arrangement includes a link assembly having (i) an internally threaded sleeve and (ii) a first externally threaded rod positioned within the internally threaded sleeve so that the first externally threaded rod is meshingly engaged with the internally threaded sleeve. The coupling arrangement also includes a handle portion being operable between a lock mode and an unlock mode, wherein when the handle portion is (i) in the lock mode relative rotation between the internally threaded sleeve and the first externally threaded rod is prevented and (ii) in the unlock mode relative rotation between the internally threaded sleeve and the first externally threaded rod is allowed. The coupling arrangement also includes an engagement portion secured to the handle portion. The engagement portion is (i) detached from the link assembly so that the engagement portion can be spaced apart from the link assembly and (ii) configured to engage a segment of the link assembly such that when (1) the handle portion is in the unlock mode and (2) the segment of the link assembly is engaged with the engagement portion, rotation of the handle portion around a longitudinal axis of the link assembly causes relative rotation between the internally threaded sleeve and the first externally threaded rod.

In accordance with a third embodiment of the present invention there is provided a method of adjusting the length of a link assembly with a latch. The link assembly includes (i) an internally threaded sleeve and (ii) an externally threaded rod positioned within the internally threaded sleeve so that the externally threaded rod is meshingly engaged with the internally threaded sleeve. The method includes the steps of (i) placing a handle portion of the latch in a lock mode in which relative rotation between the internally threaded sleeve and the externally threaded rod is prevented, (ii) removing the handle portion of the latch from the lock mode and placing the handle portion in an unlock mode in which relative rotation between the internally threaded sleeve and the externally threaded rod is allowed, (iii) positioning an engagement portion of the latch in contact with a segment of the link, (iv) rotating the handle portion around a longitudinal axis of the link assembly when the handle portion is in the unlock mode so as to cause relative rotation between the internally threaded sleeve and the externally threaded rod such that the length of the link assembly is altered, and (v) locating the engagement portion of the latch relative to the link assembly so that the engagement portion is spaced apart form the segment of the link assembly.

BRIEF DESCRIPTION OF THE DRAWINGS

FIG. 1A is a fragmentary perspective view of a link assembly of the coupling assembly of FIG. 1 after rotating a latch in a radial direction;

FIG. 6 is a side elevational view of the link assembly of the coupling arrangement shown in FIG. 1;

FIG. 7 is a top elevational view of the link assembly shown in FIG. 6; and

FIG. 8 is a cross sectional view of link assembly shown in FIG. 6.

BEST MODE FOR CARRYING OUT THE INVENTION

Figure 1:
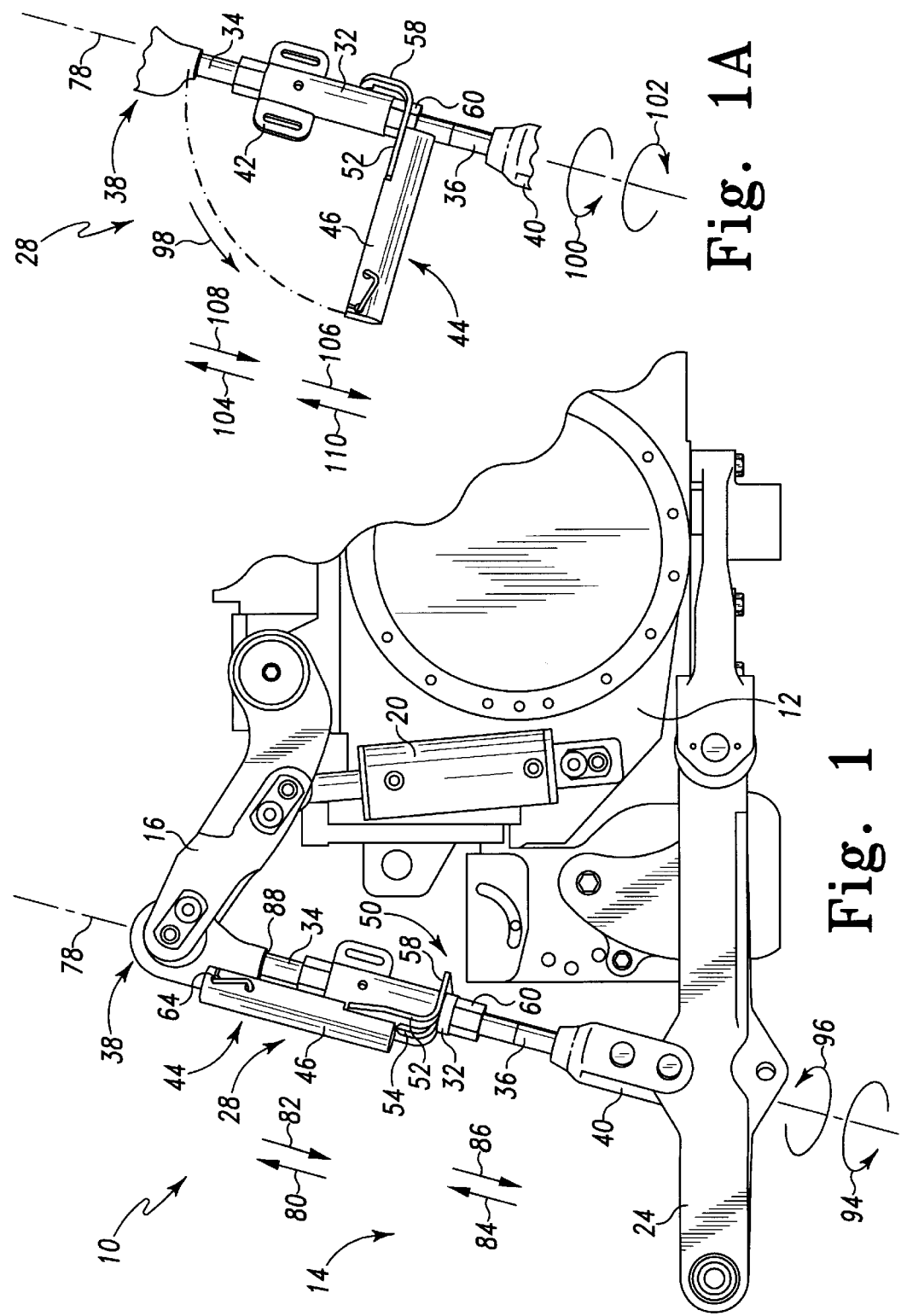
FIG. 1 is a perspective view of an exemplary coupling arrangement for a work machine which incorporates the features of the present invention therein.

While the invention is susceptible to various modifications and alternative forms, a specific embodiment thereof has been shown by way of example in the drawings and will herein be described in detail. It should be understood, however, that there is no intent to limit the invention to the particular form disclosed, but on the contrary, the intention is to cover all modifications, equivalents, and alternatives falling within the spirit and scope of the invention as defined by the appended claims.

Figure 2:
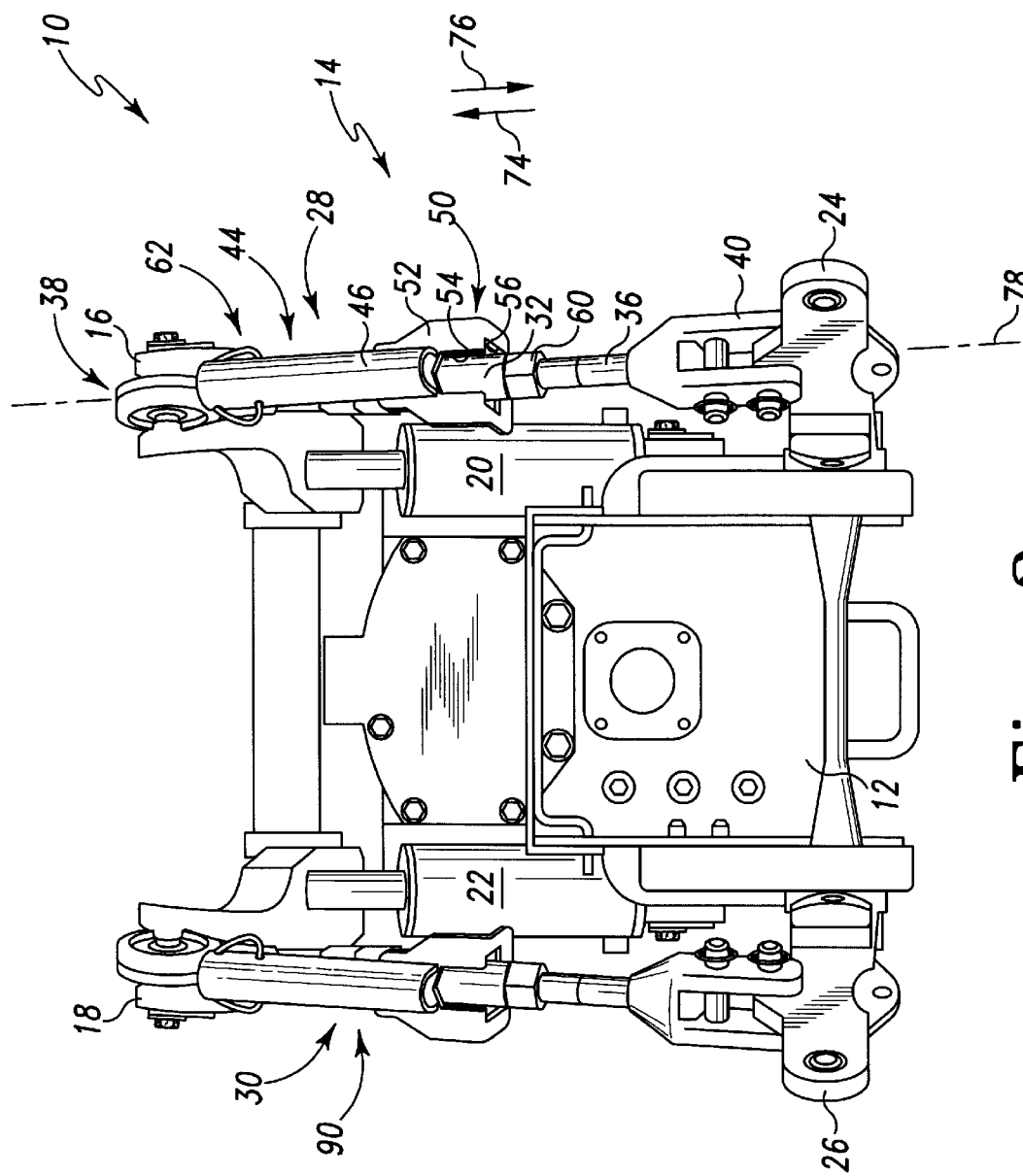
FIG. 2 is another perspective view of the coupling arrangement shown in FIG. 1.

Referring now to FIGS. 1 and 2, there is shown a portion of an exemplary work machine 10 which incorporates the features of the present invention therein. Work machine 10 includes a frame 12 and a coupling arrangement 14 extending from frame 12. Coupling arrangement 14 includes a pair of arms 16 and 18 which are pivotally secured to frame 12. Coupling arrangement 14 also includes a pair of bars 24 and 26 which are also pivotally secured to frame 12. Coupling arrangement 14 also includes a pair of hydraulic cylinders 20 and 22. One end of hydraulic cylinder 20 is attached to arm 16, while the other end of hydraulic cylinder 20 is attached to frame 12. In a similar manner, one end of hydraulic cylinder 22 is attached to arm 18, while the other end of hydraulic cylinder 22 is attached to frame 12. Coupling arrangement 14 also includes a pair of link assemblies 28 and 30. Link assembly 28 is interposed between and secured to arm 16 and bar 24. In a similar fashion, link assembly 30 is interposed between and secured to arm 18 and bar 26. Furthermore, coupling arrangement 14 includes a pair of latches 44 and 90. In particular, latch 44 is associated with link assembly 28, and latch 90 is associated with link assembly 30.

It should be understood that link assembly 30 and latch 90 are structurally and functionally identical to link assembly 28 and latch 44, respectively. Therefore, while the following description is directed to link assembly 28 and latch 44, it should be understood that the description also applies to link assembly 30 and latch 90. As such, no further description will be given of link assembly 30 and latch 90.

As shown in FIGS. 6, 7, and 8, link assembly 28 includes an internally threaded sleeve 32 with a pair of locking portions 42 extending therefrom. Link assembly 28 also includes a first externally threaded rod 34 and a second externally threaded rod 36. Both first and second externally threaded rods 34 and 36 are positioned within internally threaded sleeve 32 so that first and second externally threaded rods 34 and 36 meshingly engage with internally threaded sleeve 32. Link assembly 28 also includes a ball joint 38 attached to an end 88 of first externally threaded rod 34. Link assembly 28 further includes a clevis 40 attached to an end 92 of second externally threaded rod 36.

It should be understood that having first and second externally threaded rods 34 and 36 meshingly engaged with internally threaded sleeve 32 allows the length of link assembly 28 to be altered by rotating internally threaded sleeve 32 relative to first and second externally threaded rods 34 and 36. In particular, as shown in FIG. 1, when internally threaded sleeve 32 is rotated relative to first and second externally threaded rods 34 and 36 in the direction indicated by arrow 94, first externally threaded rod 34 is advanced out of internally threaded sleeve 32 in the direction indicated by arrow 80, and second externally threaded rod 36 is advanced out of internally threaded sleeve 32 in the direction indicated by arrow 86. Advancing first and second externally threaded rods 34 and 36 in the aforementioned manner causes the length of link assembly 28 to increase. On the other hand, rotating internally threaded sleeve 32 in the direction indicated by arrow 96 causes first externally threaded rod 34 to be advanced into internally threaded sleeve 32 in the direction indicated by arrow 82 and second externally threaded rod 36 to be advanced into internally threaded sleeve 32 in the direction indicated by arrow 84. Advancing first and second externally threaded rods 34 and 36 in the aforementioned manner causes the length of link assembly 28 to decrease.

Figure 5:
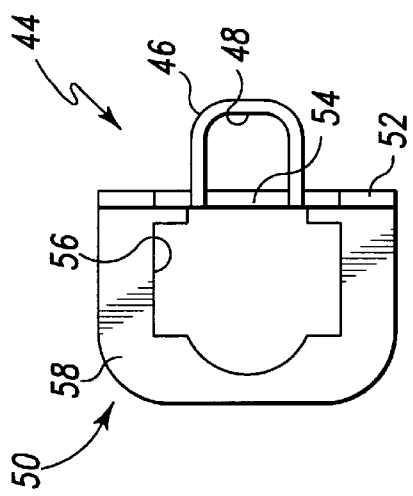
FIG. 5 is an end elevational view of latch shown in FIG. 3.
Figure 4:
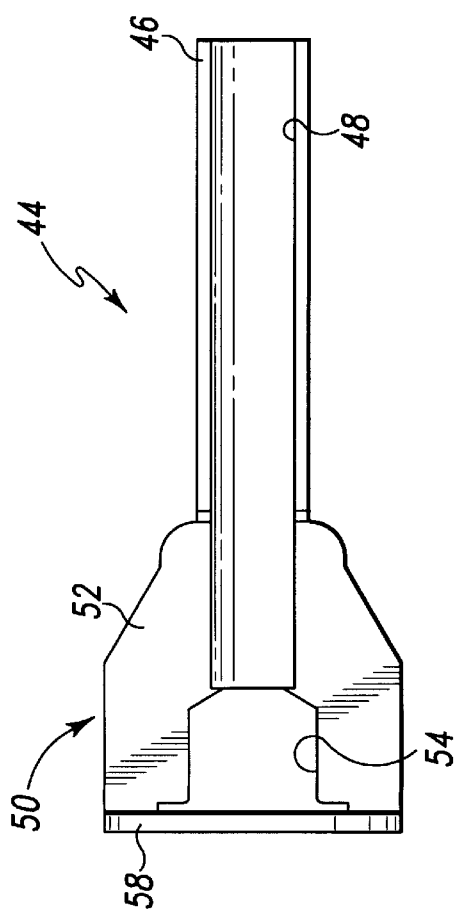
FIG. 4 is a bottom elevational view of the latch shown in FIG. 3.
Figure 3:
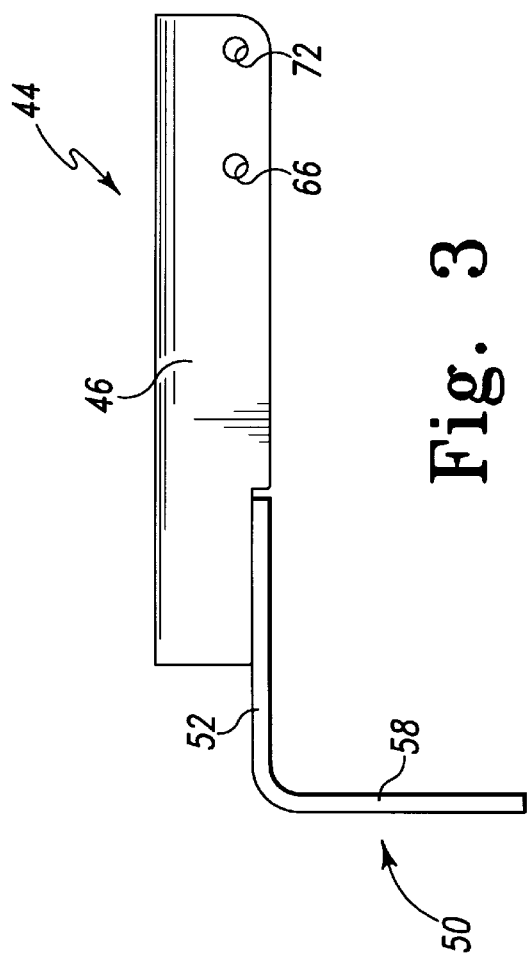
FIG. 3 is a side elevational view of the latch of the coupling arrangement shown in FIG. 1.

As shown in FIGS. 3, 4, and 5, latch 44 includes a handle portion 46 which defines a channel 48. Handle portion 46 also has a first aperture 66 and a hole 72 defined therein. Latch 44 also includes an engagement portion 50 secured to handle portion 46. Engagement portion 50 includes a first plate 52 which is attached to and extends from handle portion 46. First plate 52 has a first notch 54 defined therein. Engagement portion 50 also includes a second plate 58 which is attached to and extends from first plate 52. Second plate 58 has a second notch 56 defined therein. Latch 44 further includes an attachment mechanism 62 (see FIGS. 6, 7, and 8). Attachment mechanism 62 includes a pin 64 and a chain 70 attached to pin 64. Chain 70 is also attached to handle portion 46 of latch 44.

As described above link assembly 28 is interposed between and connected to arm 16 and bar 24. In particular, as shown in FIGS. 1 and 2, ball joint 38 and clevis 40 of link assembly 28 are respectively pinned to arm 16 and bar 24. Having link assembly 28 attached in the above described manner allows an operator of work machine 10 to actuate hydraulic cylinder 20 in a well known manner and thus move arm 16 and bar 24 in the directions indicated by arrows 74 and 76. Such movement may be required, for example, when coupling a work implement (not shown) to work machine 10.

As shown in FIGS. 1 and 2, latch 44 is positioned relative to link assembly 28 so that link assembly 28 extends through engagement portion 50. In particular, internally threaded sleeve 32 extends through second notch 56 of second plate 58. In addition, as shown in FIG. 8, latch 44 is positioned relative to link assembly 28 so that lock portion 42 extends into channel 48 of handle portion 46. Moreover, latch 44 is positioned relative to link assembly 28 so that hole 72 is linearly aligned with second aperture 68 defined in ball joint 38 (see FIG. 8).

Once latch 44 is positioned relative to link assembly 28 in the above described manner, pin 64 of attachment mechanism 62 is inserted through hole 72 and second aperture 68. Inserting pin 64 through hole 72 and second aperture 68 places attachment mechanism 62 in a attach mode. In particular, when attachment mechanism 62 is in the attach mode, handle portion 46 of latch 44 is secured to ball joint 38 as clearly shown in FIGS. 1 and 2. Furthermore, placing attachment mechanism 62 in the attach mode when locking portion 42 of internally threaded sleeve 32 is located within channel 48 of handle portion 46, places handle portion 46 in a lock mode. When handle portion 46 is in the lock mode, relative rotation between internally threaded sleeve 32 and first externally threaded rod 34 is prevented. Moreover, when handle portion 46 is in the lock mode relative rotation between internally threaded sleeve 32 and second externally threaded rod 36 is also prevented.

It should be appreciated that relative rotation between the above discussed elements is prevented as a result of locking portion 42 of internally threaded sleeve 32 being captured within channel 48 of handle portion 46. Having locking portion 42 captured in channel 48 prevents internally threaded sleeve from inadvertently rotating around a longitudinal axis 78 (and therefore first and second externally threaded rods 34 and 36) of link assembly 28 in the directions indicated by arrows 94 and 96 (see FIG. 1). Therefore, when the handle portion 46 of latch 44 is in the lock mode the length of link assembly 28 will not inadvertently change during the use of work machine 10. For example, vibrations communicated to link assembly 28 during the use of work machine 10 will not cause the length of link assembly 28 to inadvertently change when handle portion 46 is in the lock mode.

Attachment mechanism 62 can also be placed in a detach mode by withdrawing pin 64 from hole 72 and second aperture 68. When attachment mechanism 62 is in the detach mode, handle portion 46 is no longer secured to ball joint 38, and latch 44 can be moved relative to link assembly 28. In particular, as shown in FIG. 1A, handle portion 46 of latch 44 can be moved in a radial direction relative to longitudinal axis 78, as indicated by arrow 98, so that lock portion 42 is no longer positioned within channel 48 (see FIG. 4). Moving handle portion 46 so that lock portion 42 is no longer positioned within channel 48 places handle portion 46 in an unlock mode. When handle portion 46 is in the unlock mode relative rotation between internally threaded sleeve 32 and first externally threaded rod 34 is allowed. Moreover, when handle portion 46 is in the unlock mode relative rotation between internally threaded sleeve 32 and second externally threaded rod 36 is also allowed.

It should be appreciated that, regardless of whether handle portion 46 is in the lock mode or the unlock mode, engagement portion 50 remains detached from link assembly 28 so that engagement portion 50 can be spaced apart from link assembly 28.

Moving handle portion 46 in the radial direction relative to longitudinal axis 78 as described above results in a segment 60 of internally threaded sleeve 32 being engaged with engagement portion 50 of latch 44. Specifically, as shown in FIG. 1A, when segment 60 is engaged with engagement portion 50, segment 60 is (i) positioned within first notch 54 defined in first plate 52 of engagement portion 50 (see FIG. 4) and (ii) in contact with first plate 52 (see FIG. 4). In the exemplary embodiment illustrated in FIGS. 1, 1A, 2, and 6–8, segment 60 of link assembly 28 is shown as a hexagonal nut attached to internally threaded sleeve 32. (Note that, preferably, segment 60, i.e. the hexagonal nut, is integral to internally threaded sleeve 32) Therefore, it should be appreciated that first notch 54 is configured so that the shape of first notch 54 is complementary to the shape of the hexagonal nut attached to internally threaded sleeve 32.

As shown in FIG. 1A, once handle portion 46 is in the unlock mode and segment 60 is engaged with engagement portion 50, the length of link assembly 28 can be altered by rotating handle portion 46 around longitudinal axis 78 in the directions indicated by arrows 100 and arrow 102. Specifically, when handle portion 46 is rotated around longitudinal axis 78 in the direction indicated arrow 100, internally threaded sleeve 32 is also rotated along with handle portion 46 due to the engagement between segment 60 and engagement portion 50. The above described rotation of internally threaded sleeve 32 relative to first and second externally threaded rods 34 and 36 causes (i) first externally threaded rod 34 to be advanced out of internally threaded sleeve 32 in the direction indicated by arrow 104 and (ii) second externally threaded rod 34 to be advanced out of internally threaded sleeve 32 in the direction indicated by arrow 106. Advancing first and second externally threaded rods 34 and 36 in the aforementioned manner increases the length of link assembly 28. In the alternative, rotating internally threaded sleeve 32 in the direction indicated by arrow 102 with handle portion 46 causes (i) first externally threaded rod 34 to be advanced into internally threaded sleeve 32 in the direction indicated by arrow 108 and (ii) second externally threaded rod 34 to be advanced into internally threaded sleeve 32 in the direction indicated by arrow 110. Advancing first and second externally threaded rods 34 and 36 in the aforementioned manner decreases the length of link assembly 28.

After adjusting the length of link assembly 28 in the manner described above, handle portion 46 is positioned as shown in FIGS. 1 and 2 so that locking portion 42 of internally threaded sleeve 32 is once again located within channel 48. Placing locking portion 42 back in channel 48 places handle portion 46 back into the lock mode where relative rotation between first and second externally threaded rods 34 and 36 and internally threaded sleeve 32 is prevented thereby maintaining the desired length of link assembly 28. Attachment mechanism 62 is then placed back in the attach mode as described above to secure handle portion 46 to ball joint 38.

Industrial Applicability

During use of work machine 10 the length of link assembly 28 can be maintained or altered by utilizing latch 44 in the above described manner. Therefore, latch 44 allows an operator (not shown) of work machine 10 to make any necessary length adjustments to link assembly 28 to ensure that a work implement (not shown) is appropriately attached to coupling arrangement 14. For example link assembly 28 and link assembly 30 may have to be lengthened or shortened to accommodate the various structural requirements of a work implement. Ensuring that the work implement is appropriately attached to coupling arrangement 14 facilitates the efficient performance of a work function with the work implement.

Furthermore, with respect to altering the length of link assembly 28 with link 44, it should be appreciated that having engagement portion 50 detached from link assembly 28 so that engagement portion 50 can be spaced apart from link assembly 28 is an advantageous feature of the present invention. In particular, this feature allows for greater flexibility in positioning engagement portion 50 relative to segment 60 when rotating internally threaded sleeve 32 with latch 44. For example, when engagement portion 50 is engaged with segment 60, internally threaded sleeve 32 can be rotated to a first position with handle portion 46. Once located in the first position engagement portion 50 can be moved so that engagement portion 50 is no longer contacting segment 60 (i.e. engagement portion 50 is spaced apart from link assembly 28). Once engagement portion 50 is spaced apart form segment 60 engagement portion 50 can be moved relative to segment 60 without moving or rotating internally threaded sleeve 32. After relocating engagement portion 50 relative to segment 60, engagement portion 50 can be engaged with segment 60 again and internally threaded sleeve 32 rotated to a second position.

Being able to move and relocate engagement portion 50 in the above described manner allows an operator of latch 44 to locate handle portion 46 in an optimum position (e.g. out of the way of structural obstacles present in coupling arrangement 14) when adjusting the length of link assembly 28. This is in contrast to other designs which permanently secure (e.g. pin) the engagement portion of the latch to the link assembly, thereby preventing an operator of the latch from easily optimizing the position of the latch during adjustment of the length of the associated link assembly.

While the invention has been illustrated and described in detail in the drawings and foregoing description, such illustration and description is to be considered as exemplary and not restrictive in character, it being understood that only the preferred embodiment has been shown and described and that all changes and modifications that come within the spirit of the invention are desired to be protected.

What is claimed is:

1. A latch for a link assembly which includes (i) an internally threaded sleeve and (ii) an externally threaded rod positioned within said internally threaded sleeve so that said externally threaded rod is meshingly engaged with said internally threaded sleeve, said latch comprising:

a handle portion operable between a lock mode and an unlock mode, wherein when said handle portion is (i) in said lock mode relative rotation between said internally threaded sleeve and said externally threaded rod is prevented and (ii) in said unlock mode relative rotation between said internally threaded sleeve and said externally threaded rod is allowed; and an engagement portion secured to said handle portion, said engagement portion being (i) detached from said link assembly so that said engagement portion can be spaced apart from said link assembly and (ii) configured to engage a segment of said link assembly such that when (1) said handle portion is in said unlock mode and (2) said segment of said link assembly is engaged with said engagement portion, rotation of said handle portion around a longitudinal axis of said link assembly causes relative rotation between said internally threaded sleeve and said externally threaded rod.

2. The latch of claim 1, further comprising:

an attachment mechanism operable between an attach mode and a detach mode, wherein when said attachment mechanism is (i) in said attach mode said handle portion is secured to said link assembly so as to place said handle portion in said lock mode and (ii) in said detach mode said handle portion is detached from said link assembly so as to place said handle portion in said unlock mode.

3. The latch of claim 2, wherein:

said attachment mechanism includes a pin, said handle portion has a first aperture defined therein, said link assembly has a second aperture defined therein, and said pin is positioned within said first aperture and said second aperture when said handle portion is in said lock mode.

4. The latch of claim 1, wherein:

said engagement portion includes a first plate extending from said handle portion, said first plate has a first notch defined therein, and said segment of said link assembly is positioned within said first notch when said segment is engaged with said engagement portion.

5. The latch of claim 4, wherein:

said engagement portion further includes a second plate extending from said first plate, said second plate has a second notch defined therein, and said link assembly extends through said second notch when said handle portion is in said lock mode.

6. The latch of claim 1, wherein:

said handle portion defines a channel, and a lock portion of said link assembly extends into said channel when said handle portion is in said lock mode.

7. A coupling arrangement for a work machine, comprising:

a link assembly which includes (i) an internally threaded sleeve and (ii) a first externally threaded rod positioned within said internally threaded sleeve so that said first externally threaded rod is meshingly engaged with said internally threaded sleeve;

a handle portion being operable between a lock mode and an unlock mode, wherein when said handle portion is (i) in said lock mode relative rotation between said internally threaded sleeve and said first externally threaded rod is prevented and (ii) in said unlock mode relative rotation between said internally threaded sleeve and said first externally threaded rod is allowed; and an engagement portion secured to said handle portion, said engagement portion being (i) detached from said link assembly so that said engagement portion can be spaced apart from said link assembly and (ii) configured to engage a segment of said link assembly such that when (1) said handle portion is in said unlock mode and (2) said segment of said link assembly is engaged with said engagement portion, rotation of said handle portion around a longitudinal axis of said link assembly causes relative rotation between said internally threaded sleeve and said first externally threaded rod.

8. The coupling arrangement of claim 7, further comprising:

an attachment mechanism operable between an attach mode and a detach mode, wherein when said attachment mechanism is (i) in said attach mode said handle portion is secured to said link assembly so as to place said handle portion in said lock mode and (ii) in said detach mode said handle portion is detached from said link assembly so as to place said handle portion in said unlock mode.

9. The coupling arrangement of claim 8, wherein:

said attachment mechanism includes a pin, said handle portion has a first aperture defined therein, said link assembly has a second aperture defined therein, and said pin is positioned within said first aperture and said second aperture when said handle portion is in said lock mode.

10. The coupling arrangement of claim 7, wherein:

said engagement portion includes a first plate extending from said handle portion, said first plate has a first notch defined therein, and said segment of said link assembly is positioned within said first notch when said segment is engaged with said engagement portion.

11. The coupling arrangement of claim 10, wherein:

said engagement portion further includes a second plate extending from said first plate, said second plate has a second notch defined therein, and said link assembly extends through said second notch when said handle portion is in said lock mode.

12. The coupling arrangement of claim 7, wherein:

said handle portion defines a channel, and a lock portion of said link assembly extends into said channel when said handle portion is in said lock mode.

13. The coupling arrangement of claim 12, wherein:

said lock portion is attached to said internally threaded sleeve.

14. The coupling arrangement of claim 7, wherein:

said link assembly further includes a ball joint attached to an end of said first externally threaded rod.

15. The coupling arrangement of claim 7, wherein:

said link assembly further includes a second externally threaded rod positioned within said internally threaded sleeve so that said second externally threaded rod is meshingly engaged with said internally threaded sleeve.

16. The coupling arrangement of claim 15, wherein:

said relative rotation between said internally threaded sleeve and said first externally threaded rod causes said first externally threaded rod to (i) advance into or (ii) advance out of said internally threaded sleeve.

17. A method of adjusting the length of a link assembly with a latch, said link assembly including (i) an internally threaded sleeve and (ii) an externally threaded rod positioned within said internally threaded sleeve so that said externally threaded rod is meshingly engaged with said internally threaded sleeve, comprising the steps of:

placing a handle portion of said latch in a lock mode in which relative rotation between said internally threaded sleeve and said externally threaded rod is prevented;

removing said handle portion of said latch from said lock mode and placing said handle portion in an unlock mode in which relative rotation between said internally threaded sleeve and said externally threaded rod is allowed;

positioning an engagement portion of said latch in contact with a segment of said link;

rotating said handle portion around a longitudinal axis of said link assembly when said handle portion is in said unlock mode so as to cause relative rotation between said internally threaded sleeve and said externally threaded rod;

locating said engagement portion of said latch relative to said link assembly so that said engagement portion is spaced apart form said segment of said link assembly; and repeating the steps of positioning, rotating, and locating until the length of said link assembly is altered to a desired length.

18. The method of claim 17, wherein:

said positioning step includes the step of moving said handle portion in a radial direction relative to said longitudinal axis so that said handle portion extends outwardly from said link assembly when said engagement portion is in contact with said segment.

19. The method of claim 17, wherein:

said placing step includes the step of attaching said handle portion to said link assembly with an attachment mechanism, and said removing step includes the step of detaching said handle portion from said link assembly.

20. The method of claim 17, wherein:

said handle portion defines a channel, and a lock portion of said link assembly extends into said channel when said handle portion is in said lock mode.

* * * * *